RECEIVER MUTING SYSTEM FOR TWO-WAY RADIO
COMMUNICATION EQUIPMENT
Filed May 5, 1964
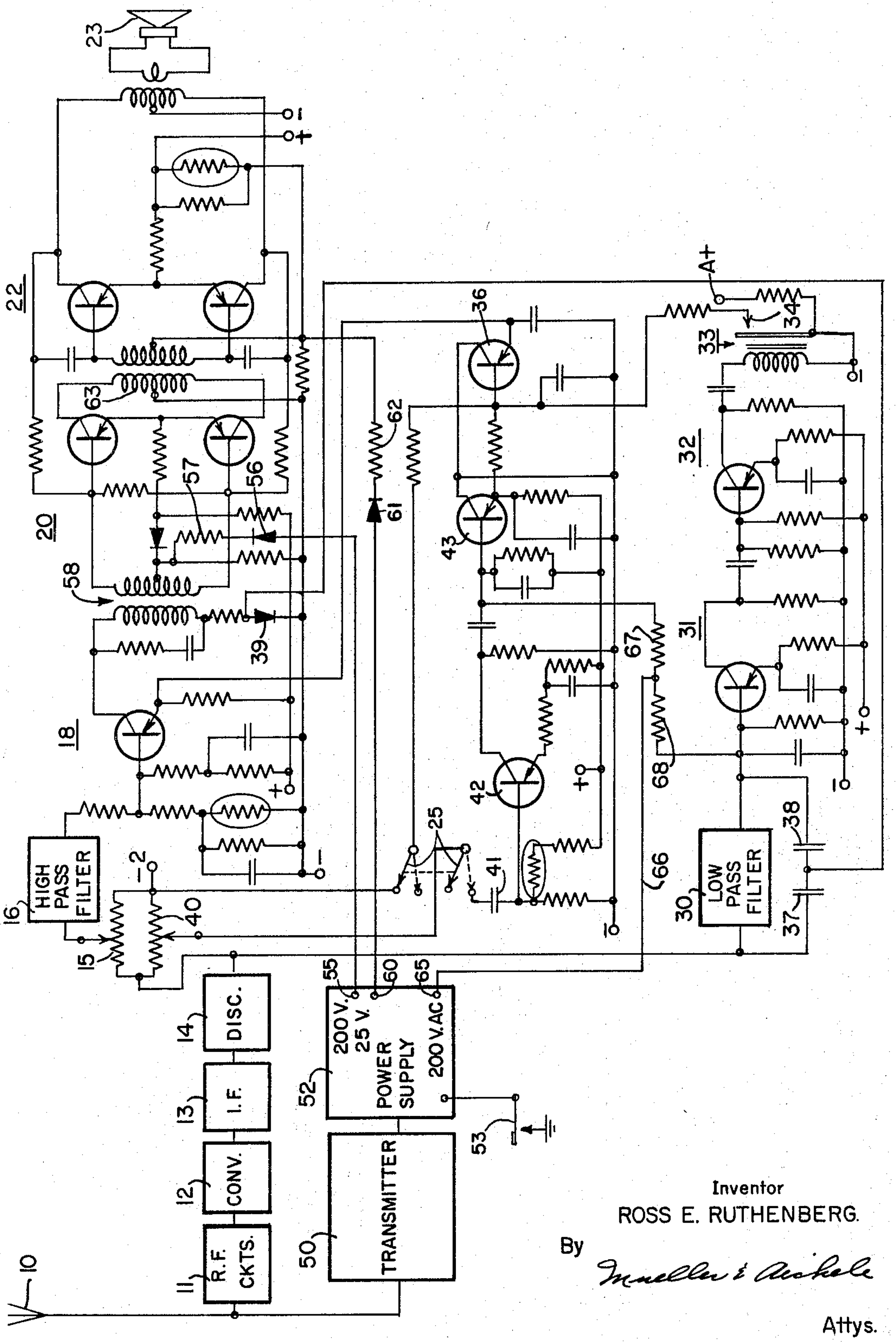
Inventor
ROSS E. RUTHENBERG
By Mueller & Aichele
Attys.

United States Patent Office 3,328,695
Patented June 27, 1967

3,328,695

RECEIVER MUTING SYSTEM FOR TWO-WAY RADIO COMMUNICATION EQUIPMENT

Ross E. Ruthenberg, Blue Island, Ill., assignor to Motorola, Inc., Franklin Park, Ill., a corporation of Illinois Filed May 5, 1964, Ser. No. 364,899
6 Claims. (Cl. 325—22)

This invention relates generally to audio muting circuits for radio receivers, and more particularly to a circuit for muting transistor audio circuits without the use of movable switch contacts.

In radio receivers, it is desirable in many cases to be able to mute the audio output. In a combined transmitter and receiver unit, it is desired to mute the receiver output during transmissions so that no audio output is provided. In the past, receiver muting has generally been accomplished by use of a relay having contacts for opening the audio circuit. As movable contacts have been found to be objectionable in electronic equipment, it is desirable to provide the muting entirely by electronic means.

In a receiver which is tuned to a channel on which a signal is transmitted only intermittently, it may be desired to mute the receiver to eliminate noises produced when no signal is received. In a receiver which is tuned from one station to another, it is similarly desirable to mute the receiver when no signal is received during tuning. Receivers may have squelch circuits to control the audio amplifier so that audio output is provided only when desired signals are being received. When such a receiver is used in a two-way system, it may be desired to utilize the squelch circuit in the system for muting the receiver audio circuit during transmissions.

It is, therefore, an object of the present invention to provide a transmitter and receiver unit with means for automatically muting the receiver when the transmitter is operating.

A further object of the invention is to provide a receiver muting system which includes no relay contacts.

Another object is to provide a muting system for a receiver having a squelch circuit, wherein the muting system utilizes the squelch circuit to hold the receiver muted following a transmission.

A feature of the invention is the provision of a transmitter-receiver unit including a power supply which is energized for operating the transmitter, and a receiver with an audio circuit, with a connection from the power supply to the receiver to apply a bias voltage to the audio circuit to cut off the audio during transmissions.

Another feature of the invention is the provision of a receiver muting arrangement for use in a transmitter-receiver unit, wherein the power supply when actuated during transmissions applies D.C. potential to one or more audio amplifiers to bias the same off, and provides alternating current signals to the squelch circuit of the receiver as a noise voltage to hold the audio channel of the receiver cut off, so that the receiver is completely muted during transmissions and for an interval thereafter.

A further feature of the invention is the provision of a system for muting a receiver wherein voltages derived from the power supply are applied to a noise squelch circuit to cut off the receiver audio circuit and also to a tone squelch circuit to desensitize the tone amplifier so that it does not provide adequate tone voltage to override the noise squelch circuit and thereby render the audio amplifier operative.

The invention is illustrated in the drawing wherein the single figure is a partial block and partial schematic diagram of a transmitter and receiver unit including the receiver muting system of the invention.

The receiver muting system of the invention is provided in two-way communication equipment including a transmitter having a power supply for energizing the transmitter, and a receiver having a squelch circuit responsive to noise to cut off the audio in the absence of a carrier wave. The squelch circuit may also be responsive to a tone to render the receiver operative when the tone is received. The power supply is actuated only when it is desired to transmit, by action of a push-to-talk switch. Direct current voltages are derived from the power supply and applied to the audio stages of the receiver to bias such stages off to cut off the audio output during transmisson. An alternating current voltage derived from the power supply may be coupled to the noise detector of the squelch circuit to act as noise to operate the squelch to cut off the audio circuit of the receiver. The inherent recovery time of the squelch circuit acts to hold the audio cut off for a time after the end of a transmission, at which time the audio will either remain cut off due to noise at the squelch circuit input or will turn on due to the lack of noise in the presence of a desired signal. The alternating current voltage may also be applied to the amplifier of the tone squelch circuit to desensitize the amplifier so that there is not sufficient tone output to open the squelch. The direct current and alternating current voltages are present in the power supply only when the system is conditioned for transmission and accordingly have no effect on the normal operation of the receiver. However, these voltages which are present during transmission act to mute the receiver so that there is no audio output during transmissions.

Referring now to the drawing, the two-way communication system shown includes an antenna 10 applying signals to the radio frequency circuits 11 of the frequency modulation receiver, which is of the superheterodyne type. The signals are reduced in frequency by converter 12, which may include one or more stages of frequency conversion, and are amplified in intermediate frequency amplifier 13. The audio signals are derived from the frequency modulated wave by discriminator 14, and applied through volume control 15 and high pass filter 16 to transistor amplifier 18. The signals from amplifier 18 are applied to push-pull driver amplifier 20, and to push-pull output stage 22 which feeds the loudspeaker 23.

The receiver includes a squelch circuit for responding to noise in the absence of a carrier wave, and for selectively responding to tones applied with the audio signals to control the audio amplifiers. The squelch circuit is generally similar to that described and claimed in Patent No. 3,027,-455, issued Mar. 27, 1962, and assigned to Motorola, Inc., the assignee of the present invention. The switch 25 controls the mode of operation of the squelch circuit and is shown in position for tone squelch operation. When so connected, the audio output of the discriminator 14 is applied through low pass filter 30 to transistor amplifier 31, and to transistor stage 32 which operates as an amplifier-limiter for driving reed device 33. When signals of a particular tone frequency are passed by filter 30 and reach the required amplitude level, the reed device 33 is actuated to connect contact 34 thereof to a positive potential for operating the switch transistor 36. This provides a bias to the audio amplifier 18 to render the same conducting.

The low pass filter 30 is bypassed by capacitors 37 and 38 which apply a limited amount of high frequencies from the audio to the amplifier 31. The center connection between the capacitors 37 and 38 is connected to the reference potential by diode 39. When amplifier 18 conducts, diode 39 conducts to short capacitor 37 to ground to remove the bypass around filter 30. This operation is described and claimed in Patent No. 3,131,354, issued Apr. 28, 1964, and assigned to Motorola, Inc., the assignee of the present invention.

When the switch 25 is in the dotted line position, the audio signal at the output of the discriminator 14 is derived from the movable tap on potentiometer 40 and applied through capacitor 41 to noise limiter transistor 42. The capacitor 41 is selected to pass only high frequency noise above the audio range. The noise is detected by the stage including transistor 43, and operates switch transistor 36 to provide a bias to amplifier 18 so that it is cut off.

The transmitter 50 of the two-way system applies signals to the same antenna 10 from which signals are fed to the receiver. Switching means may be provided to isolate the receiver circuit from the transmitter during transmission, in a well known manner. The transmitter is energized by power supply 52 which is rendered operative by switch 53. The switch 53 may be the push-to-talk switch associated with a microphone which applies signals to the transmitter 50.

The power supply includes a terminal 55 at which a relatively high positive direct current voltage appears, such as 200 volts. This voltage is applied through diode 56 and resistor 57, and through the secondary winding of the coupling transformer 58 to the base electrodes of the transistors of push-pull driver stage 20. This positive voltage biases off the transistors of stage 20 so that there will be no output signals therefrom. The positive voltage is present at terminal 55 only during transmissions, and cuts off the audio output of the receiver during such times.

A lower positive direct current voltage may be derived from terminal 60 of the power supply 52 and applied through diode 61 and resistor 62 and the secondary winding of the coupling transformer 63 to the base electrodes of the transistors of audio output stage 22. The positive voltage applied to the base electrodes of the transistors will cut off the transistors so that there will be no output signals applied therefrom to the loudspeaker.

The muting action on stages 20 and 22, as described, will be removed as soon as the transmission is terminated by release of switch 53. This may allow a noise burst to be produced at the audio output during the time required for the noise squelch circuit to operate. To prevent this, an alternating current voltage may be applied from the power supply to the noise squelch circuit during transmission. A relatively high alternating current voltage, such as 200 volts, is available at terminal 65 of the power supply 52, and this voltage is coupled through conductor 66 and resistor 67 to the base electrode of detector transistor 43. This is the same electrode to which noise from the ouput of limiter transistor 42 is applied. Accordingly, when the power supply 52 is actuated, an alternating current voltage will be applied to the base electrode of the detector 43 so that an output is produced therein and applied to switch transistor 36 to cut off audio amplifier 18.

A voltage will be present at the output of detector 43 when the power supply is energized, whether or not noise signals are applied from the discriminator output through the limiter 42 to the detector 43. At the termination of a transmission, the noise squelch circuit is held operated by its inherent recovery time for a sufficient period to prevent the reproduction of a burst of noise before the noise squelch circuit operates in its normal mode. The noise squelch operation will hold the audio stage 18 cut off until a desired signal is received.

The alternating current voltage from terminal 65 is also applied through conductor 66 and resistor 68 to the base electrode of the transistor of amplifier 31. The voltage so applied will be quite large compared to the tone signals applied through low pass filter 30 to the base electrode. Actually the voltage from the power supply is large enough to desensitize amplifier 31 so that any tone signal applied thereto will produce a very small output from the amplifier, and this is insufficient to actuate the driver amplifier 32 so that the reed device 33 will respond. Accordingly, the reed device will not actuate the transistor switch 36 to open the squelch, and the amplifier 18 will remain cut off during transmission.

It is therefore seen that the muting system of the invention acts to mute the receiver output during transmission and includes no relays or other mechanical moving parts. The system may operate on the audio circuit and/or the noise squelch circuit of the receiver and requires only simple connections from the power supply to the audio circuit and to the noise detector of the noise squelch circuit to provide a control voltage which cuts off the audio amplifier. In systems having tone squelch facilities which may override the noise squelch circuit, the alternating current voltage from the power supply may be applied to the tone amplifier to desensitize the same so that it cannot open the squelch. The system of the invention requires only inexpensive connections between existing components and has been found to be entirely satisfactory in operation.

I claim:

1. A receiver muting system for two-way communication equipment including a transmitter with a power supply which is energized only during transmissions, and a receiver which provides an audio output and which has a squelch circuit for selectively cutting off the receiver audio output which includes a noise detector and a tone amplifier, said muting system including circuit means connected to the power supply for deriving an alternating current potential therefrom when the power supply is energized, said circuit means having a first portion connected to the noise detector and applying said potential thereto for causing the squelch circuit to operate to cut off the audio output of the receiver, said circuit means having a second portion connected to the tone amplifier for rendering the same insensitive to tone signals, whereby the receiver is muted during operation of the transmitter.

2. A receiver muting system for two-way communication equipment including a transmitter with a power supply which is energized only during transmissions, and a receiver which has an audio stage for providing an audio output, and a squelch circuit for selectively cutting off the receiver audio output which includes a noise detector and a tone amplifier, said muting system including in combination, first circuit means connected to the power supply for deriving an alternating current potential therefrom when the power supply is energized, said first circuit means having a first portion connected to the noise detector and applying said potential thereto for causing the squelch circuit to operate to cut off the audio output of the receiver, said first circuit means having a second portion connected to the tone amplifier for rendering the same insensitive to tone signals, and second circuit means connected to the power supply for deriving a direct current potential therefrom when the power supply is energized, said second circuit means having a portion connected to the audio stage of the receiver for applying a potential thereto to cut off said stage, whereby the receiver is muted during operation of the transmitter.

3. A receiver muting system for two-way communication equipment including a transmitter with a power supply which is energized only during transmissions, and a receiver which has an audio stage for providing an audio output and a squelch circuit for selectively cutting off the receiver audio output and which includes a noise detector, said muting system including in combination, first circuit means connected to the power supply for deriving a direct current potential therefrom when the power supply is energized, said first circuit means having a portion connected to the audio stage of the receiver for cutting off said stage whereby the receiver is muted during operation of the transmitter, and second circuit means connected to the power supply for deriving an alternating current potential therefrom when the power supply is energized, said second circuit means having a portion connected to the noise detector and applying said potential thereto for causing the squelch circuit to operate to cut off the audio output of the receiver, said squelch circuit acting to hold the receiver cut off for a period of time after energization of the transmitter is terminated.

4. A receiver muting system for two-way communication equipment including a transmitter with a power supply which is energized only during transmissions, and a receiver which has an audio circuit including first, second, and third audio stages connected in cascade for providing an audio output, and a squelch circuit for selectively cutting off the first audio stage and which includes a noise detector and a tone amplifier, said muting system including in combination, first circuit means connected to the power supply for deriving direct current potentials therefrom when the power supply is energized, said first circuit means having a first portion connected to the second audio stage of the receiver for applying a potential thereto to cut off said stage, and a second portion connected to the third audio stage of the receiver for applying a potential thereto to cut off such stage, and second circuit means connected to the power supply for deriving an alternating current potential therefrom when the power supply is energized, said second circuit means having a first portion connected to the noise detector and applying said potential thereto for causing the squelch circuit to operate to cut off the audio output of the receiver, said second circuit means having a second portion connected to the tone amplifier for rendering the same insensitive to tone signals, whereby the receiver is muted during operation of the transmitter.

5. A receiver muting system for two-way radio communication equipment including a transmitter with a power supply which provides alternating current and direct current potentials only during transmissions, and a receiver which has an audio stage for providing an audio output and a squelch circuit for selectively cutting off the receiver audio output which includes a noise detector actuated by alternating current signals applied thereto, said muting system including in combination, first circuit means connected to the power supply for deriving the alternating current potential therefrom during transmissions, said first circuit means having a portion connected to the noise detector and applying said alternating current potential thereto for causing the squelch circuit to operate to cut off the audio output of the receiver, and second circuit means connected to the power supply for deriving the direct current potential therefrom during transmissions, said second circuit means having a portion connected to the audio stage of the receiver for applying a potential thereto to cut off said stage, whereby the receiver is muted during operation of the transmitter.

6. A receiver muting system for two-way radio communication equipment including a transmitter with a power supply which provides an alternating current potential only during operation of the transmitter, and a receiver which has an audio stage for providing an audio output, said muting system including in combination, a squelch circuit coupled to the receiver audio stage and including a noise detector responsive to alternating current signals for actuating said squelch circuit to selectively cut off the receiver audio stage, said squelch circuit having means acting to hold the audio stage cut off for a period of time after the alternating current signal is terminated, and circuit means connected to the power supply for deriving the alternating current potential therefrom during operation of the transmitter, said circuit means having a portion connected to said noise detector and applying said alternating potential thereto for causing said squelch circuit to operate to cut off the audio stage of the receiver, whereby the receiver is muted during operation of the transmitter and for a period of time thereafter.

References Cited

UNITED STATES PATENTS

| | | | |
|---|---|---|---|
| 2,657,304 | 10/1953 | Parks | 325—21 |
| 2,706,242 | 4/1955 | Ramson | 325—21 |
| 2,868,964 | 1/1959 | Mohr | 325—21 |
| 2,939,949 | 6/1960 | Curtis | 325—21 X |
| 3,117,241 | 1/1964 | Paynter et al. | 325—21 X |

JOHN W. CALDWELL, *Acting Primary Examiner.*